(12) United States Patent
Yamaguchi et al.

(10) Patent No.: US 11,099,395 B2
(45) Date of Patent: Aug. 24, 2021

(54) VIRTUAL IMAGE DISPLAY DEVICE

(71) Applicant: SEIKO EPSON CORPORATION, Tokyo (JP)

(72) Inventors: Tokito Yamaguchi, Azumino (JP); Masayuki Takagi, Azumino (JP); Toshiaki Miyao, Matsumoto (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/742,996

(22) Filed: Jan. 15, 2020

(65) Prior Publication Data

US 2020/0225483 A1    Jul. 16, 2020

(30) Foreign Application Priority Data

Jan. 16, 2019  (JP) ............................. JP2019-004981

(51) Int. Cl.
  *G02B 27/01*     (2006.01)
  *F21V 8/00*      (2006.01)
(52) U.S. Cl.
  CPC ......... *G02B 27/0172* (2013.01); *G02B 6/002* (2013.01); *G02B 6/0048* (2013.01); *G02B 2027/0123* (2013.01); *G02B 2027/0178* (2013.01)

(58) Field of Classification Search
  CPC .................. G02B 6/002; G02B 6/0048; G02B 2027/0123
  See application file for complete search history.

(56) References Cited

U.S. PATENT DOCUMENTS

2016/0178909 A1*  6/2016  Komatsu .............. G02B 17/086
                                                              345/8
2017/0180685 A1   6/2017  Takagi et al.

FOREIGN PATENT DOCUMENTS

JP      2017-111363 A     6/2017

\* cited by examiner

*Primary Examiner* — Sung H Pak
(74) *Attorney, Agent, or Firm* — Oliff PLC

(57) ABSTRACT

A virtual image display device includes a video image element that displays an image, and a light-guiding member that guides video image light from the video image element by reflection and transmission at a plurality of light-guiding surfaces. Among the plurality of light-guiding surfaces, with respect to an incident-side light-guiding surface and an emission-side light-guiding surface that are adjacent to each other, and an opposing light-guiding surface that faces the incident-side light-guiding surface and the emission-side light-guiding surface, a thickness from the incident-side light-guiding surface to the opposing light-guiding surface is caused to be smaller than a thickness from the emission-side light-guiding surface to the opposing light-guiding surface.

15 Claims, 12 Drawing Sheets

VIRTUAL IMAGE DISPLAY DEVICE

The present application is based on, and claims priority from JP Application Serial Number 2019-004981, filed Jan. 16, 2019, the disclosure of which is hereby incorporated by reference herein in its entirety.

BACKGROUND

1. Technical Field

The present disclosure relates to a virtual image display device, such as a head-mounted display.

2. Related Art

As a virtual image display device, such as a head-mounted display or the like, as illustrated in JP-A-2017-111363, for example, a device is known in which, in a light-guiding member for guiding image light to a position in front of the eye of an observer, a flat surface on the side closer to the eye and a free form surface connected thereto are connected without a substantial step. Note that, below, the head-mounted display is also described as an HMD.

However, for example, in a case in which further widening of an angle of view is attempted with a configuration such as that illustrated in JP-A-2017-111363, in the light-guiding member, a surface that reflects the image light becomes wider and the overall size of the light-guiding member may also increase. There is a demand to avoid such a situation, namely, when widening the angle of view of the HMD, a demand to maintain a more compact shape of the overall product that fits the shape of the head of the observer (the wearer).

SUMMARY

A virtual image display device according to an aspect of the present disclosure includes a video image element configured to display an image, and a light-guiding member configured to guide video image light from the video image element by reflection and transmission at a plurality of light-guiding surfaces. Among the plurality of light-guiding surfaces, with respect to an incident-side light-guiding surface and an emission-side light-guiding surface that are adjacent to each other, and an opposing light-guiding surface that faces the incident-side light-guiding surface and the emission-side light-guiding surface, a thickness from the incident-side light-guiding surface to the opposing light-guiding surface is smaller than a thickness from the emission-side light-guiding surface to the opposing light-guiding surface.

DESCRIPTION OF EXEMPLARY EMBODIMENTS

A virtual image display device according to an embodiment of the present disclosure will be described below in detail with reference to FIG. 1 and the like.

Figure 1:
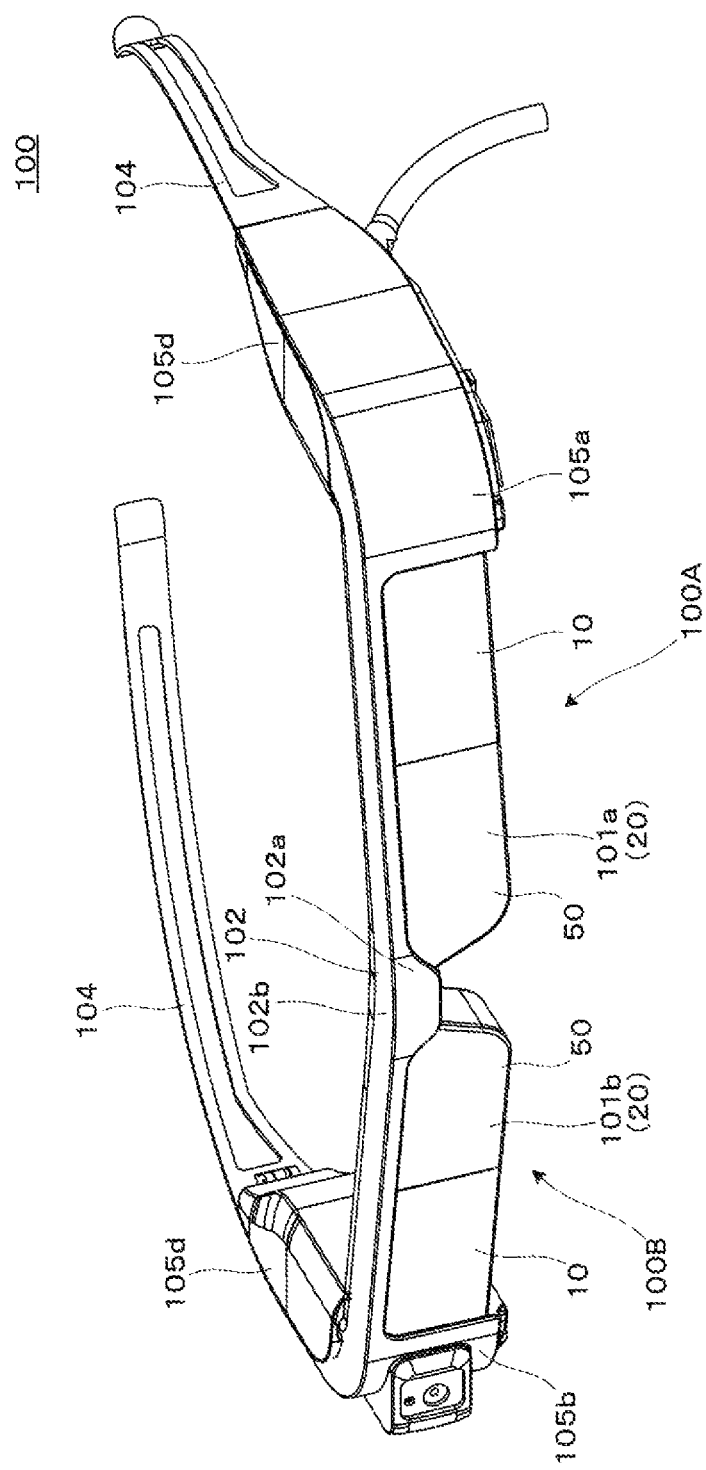
FIG. 1 is a perspective view illustrating an external appearance of an example of a virtual image display device according to an embodiment.

As illustrated in FIG. 1 and the like, a virtual image display device 100 according to the present embodiment is a head-mounted display (HMD) having an eyeglass-like external appearance. The virtual image display device 100 can allow an observer or user wearing the virtual image display device 100 to visually recognize image light (video image light) by a virtual image, and can also cause the observer to visually recognize or observe an external world image in a see-through manner. In other words, the video image light and external light can be simultaneously visually recognized. The virtual image display device 100 is provided with a first display device 100A, a second display device 100B, and a frame portion 102.

The first display device 100A and the second display device 100B are portions that form virtual images for the left eye and the right eye, respectively, and include first and second optical members 101a and 101b that cover in front of the eyes of the observer in a see-through manner, and first and second image forming main bodies 105a and 105b. As will be described later, each of the first and second image forming main bodies 105a and 105b is configured by optical systems for image formation, such as a display device (a video image element), a projection lens, or the like, and a member housing these optical systems, and the like. Note that the display device (the video image element), the projection lens, and the like are supported and housed by being covered by a cover-like outer packaging member (case member) 105d. The first and second optical members 101a and 101b configure light-guiding devices including light guiding members, and are light guiding portions that guide the video image light formed by the first and second image forming main bodies 105a and 105b and cause the external light and video image light to be visually recognized in a superimposed manner. Hereinafter, the first optical member 101a or the second optical member 101b is also referred to as a light-guiding device 20. Note that the first display device 100A and the second display device 100B also individually function as virtual image display devices.

The frame portion 102 is a long thin member that is bent into a U-shape in plan view, and includes a central portion 102a having a thick wall structure and provided to be connected to both the first optical member 101a and the second optical member 101b, namely, to the pair of light-guiding devices 20, and a support body 102b that extends from the central portion 102a along the first and second optical members 101a and 101b and further forms a location at which it is bent into the U-shape.

Note that temples 104 are provided, which are temple portions provided extending rearward from both left and right ends of the frame portion 102, and which can be used to support the frame portion 102 by being in contact with the ears, temples, or the like of the observer.

Figure 2:
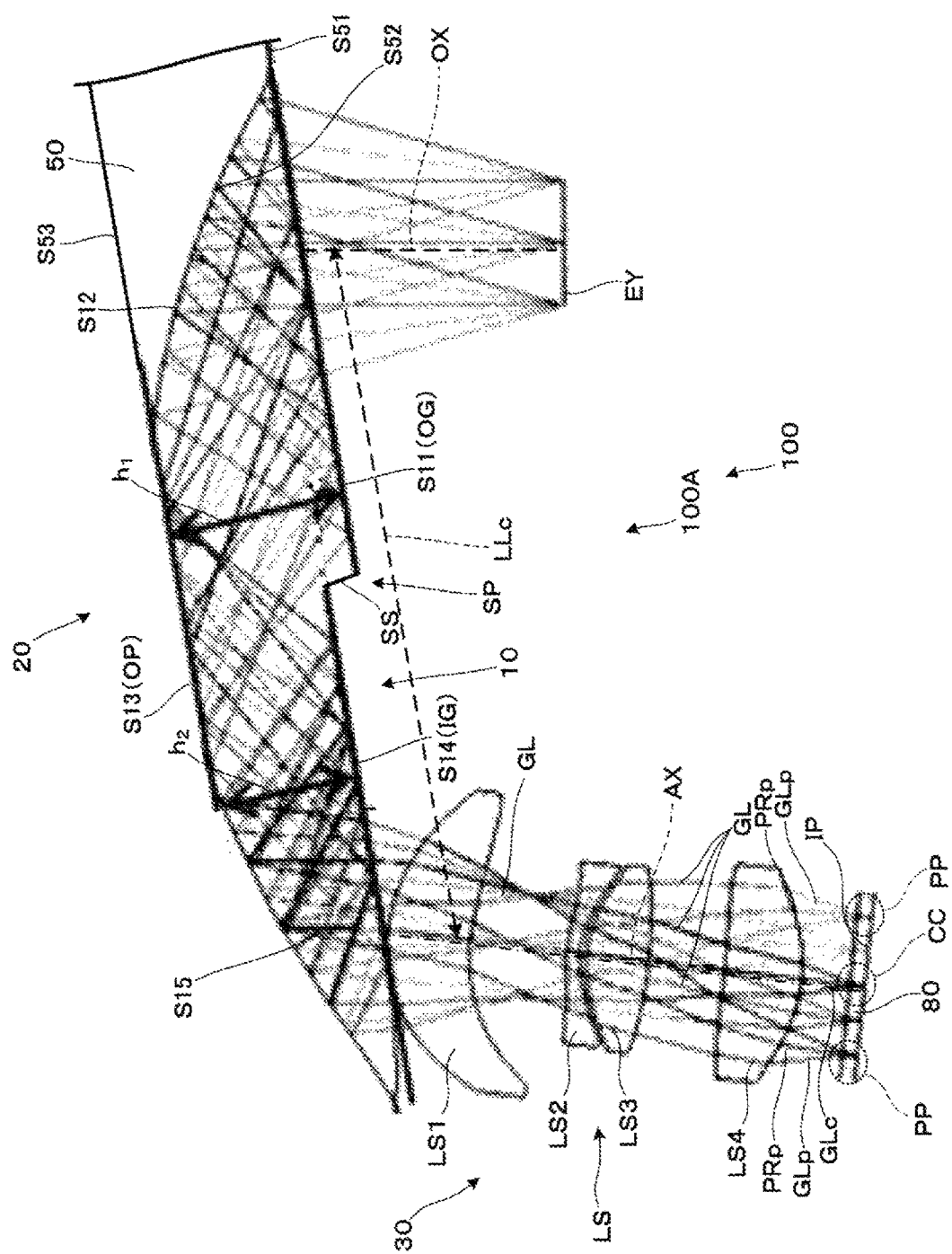
FIG. 2 is a plan cross-sectional view illustrating an optical system of the virtual image display device and an optical path of image light.

Below, with reference to a plan cross-sectional view in FIG. 2, a conceptual description will be given of an example of a configuration and the like for guiding video image light GL in the virtual image display device 100. FIG. 2 is a diagram illustrating a part of the first display device 100A, and in particular, portions of the optical system are extracted therein. Note that, although the devices for guiding the video image light GL are the first display device 100A and the second display device 100B (see FIG. 1), as described above, because the first display device 100A and the second display device 100B are left-right symmetric and have the same structure as each other, only the first display device 100A will be described, and a description of the second display device 100B will be omitted.

As illustrated in FIG. 2, the first display device 100A is provided with an image display device 80 that forms the video image light GL, a projection optical system 30 including a projection lens LS for image formation housed in a lens tube (not illustrated), and the light-guiding device 20 that guides the video image light GL that has passed through the image display device 80 and the projection lens LS. The light-guiding device 20 is configured by a light-guiding member 10 for guiding light and for a see-through perspective, and a light transmitting member 50 for the see-through perspective. Here, for example, the first display device 100A displays a video image with a wide angle of view with a horizontal angle of view of 25° or greater.

The image display device 80 can be configured by a video image element (a video image display element) configured by a light-emitting type element, such as an organic EL, for example. Further, in addition to the video image display element that is a transmission-type spatial light modulating device, for example, the image display device 80 may be configured to include an illumination device that is a backlight for emitting illumination light onto the video image display element, and a drive control unit that controls operations. Note that the image display device 80 is rectangular and forms a rectangular image surface IP, and emits the video image light GL from each of positions of the image surface IP. Here, the normal direction of the image surface IP corresponds to an optical axis direction in which an optical axis AX of the projection lens LS that configures the projection optical system 30 extends.

Further, as illustrated in FIG. 2, of the video image light GL emitted from the image surface IP of the image display device 80, a component of a principal ray of component light GLc emitted from a center portion CC of the image surface IP is referred to as a component PRc, and a component of a principal ray of component light GLp emitted from a peripheral portion PP is referred to as a component PRp. As illustrated in FIG. 2, at an eye position EY, the component light GLc from the center side is incident from a front-facing direction without any angle, while the component light GLp from the peripheral side is incident at a significant angle. In other words, in order to achieve a wide angle of view of the video image light GL, the component light GLp from the peripheral side needs to be considered. In the present embodiment, as representative of the component light GLp, an optical path of the component PRp of the principal ray of the component light GLp will be described below.

The projection optical system 30 is provided with the projection lens LS including, as structural elements, a plurality of optical elements aligned along the direction in which the incident-side optical axis AX extends, for example, and the projection lens LS is housed and supported by an optical component holding member, such as the lens tube (not illustrated). In the illustrated example, the projection lens LS is configured by four lenses LS1 to LS4. Among the lenses LS1 to LS4, a lens is included that is configured by an aspherical lens including including both an axially non-symmetric aspherical surface (non-axisymmetric aspherical surface) and an axially symmetric aspherical surface (axisymmetric aspherical surface), for example. In other words, the projection lens LS configures an asymmetric optical system. Accordingly, an intermediate image corresponding to the display image can be formed inside the light-guiding member 10 in cooperation with a portion of the light-guiding member 10 configuring the light-guiding device 20. The projection lens LS projects the video image light GL formed by the image display device 80 toward the light-guiding device 20 and causes the video image light GL to be incident on the light-guiding device 20. Note that, although a detailed description is omitted here, the lens tube that houses the projection lens LS is housed and supported by the outer packaging member 105d illustrated in FIG. 1.

As described above, the light-guiding device 20 is configured by the light-guiding member 10 for guiding the light and for the see-through perspective, and the light transmitting member 50 for the see-through perspective. Further, the light-guiding device 20 is provided with a hard coat layer that is a protective layer on a surface portion thereof, so that a main body member thereof is covered and protected. The light transmitting member 50 is a member (an auxiliary optical block) that assists the see-through function of the light-guiding member 10, that is, it is a light transmitting portion, and is integrally fixed with the light-guiding member 10 to form the single light-guiding device 20. The light-guiding device 20 is accurately positioned and fixed with respect to the projection lens LS by being screwed to the optical component holding member such as the lens tube, for example.

The light-guiding member 10 includes first to fifth sides S11 to S15 as side surfaces having an optical function. Of these surfaces, the first surface S11 and the fourth surface S14 are adjacent, and the third surface S13 and the fifth surface S15 are adjacent. Further, the second surface S12 is disposed between the first surface S11 and the third surface S13. A half mirror layer is attached to the surface of the second surface S12. The half mirror layer is a reflective film (a semi-transmissive reflective film) having light transmissivity and is set to have appropriate reflectivity with respect to the video image light, by being formed by a metallic reflective film or a dielectric multilayer film. Specifically, the light-guiding member 10 includes a transmissive reflective surface that covers the front of the eyes when worn by the observer. In addition, of the first to fifth surfaces S11 to S15, the third surface S13 and the first surface S11 are planar surfaces. Specifically, these are formed in a planar portion of the light-guiding member 10. On the other hand, the second surface S12, the fourth surface S14, and the fifth surface S15 are free curved surfaces. Specifically, these are formed in a free curved surface portion of the light-guiding member 10.

Further, in the case described above, it can be considered that, in the light-guiding member 10, a plurality of light-guiding surfaces that guide the video image light GL are formed by the first to fifth surfaces S11 to S15, that is, the light-guiding member 10 is configured to guide, from the image display device 80, the image light that has passed through the projection optical system 30, through the reflection and transmission at the plurality of light-guiding surfaces.

In addition, in this case, of the first to fifth surfaces S11 to S15 that are the plurality of light-guiding surfaces, with respect to the fourth surface S14 and the first surface S11 that are adjacent to each other, the fourth surface S14 positioned relatively closer to the image display device 80, that is, on the upstream side of the optical path, can be considered to be an incident-side light-guiding surface IG positioned on a side on which the video image light is incident. On the other hand, the first surface S11 positioned relatively closer to the position EY of the eye of the observer, that is, on the downstream side of the optical path, can be considered to be an emission-side light-guiding surface OG positioned on a side from which the video image light is emitted.

In addition, of the first to fifth surfaces S11 to S15 that are the plurality of light-guiding surfaces, the third surface S13 that is disposed so as to face the fourth surface S14 and the first surface S11 can be considered to be an opposing light-guiding surface OP facing the incident-side light-guiding surface IG and the emission-side light-guiding surface OG.

In particular, in the present embodiment, with respect to the above-described incident-side light-guiding surface IG, emission-side light-guiding surface OG, and opposing light-guiding surface OP, a thickness from the incident-side light-guiding surface IG to the opposing light-guiding surface OP is smaller than a thickness from the emission-side light-guiding surface OG to the opposing light-guiding surface OP.

Further, in the present embodiment, as a result of the formation of the arrangement relationship such as that described above, the light-guiding member 10 includes a step portion SP between the incident-side light-guiding surface IG and the emission-side light-guiding surface OG that are adjacent to each other. The step portion SP is a portion that continuously connects the incident-side light-guiding surface IG and the emission-side light-guiding surface OG in a state in which a step exists therebetween, and includes a connecting surface SS for connecting the incident-side light-guiding surface IG and the emission-side light-guiding surface OG. In other words, in the present embodiment, as a result of the step portion SP being provided in the light-guiding member 10, a mode is obtained in which a difference is created between the thicknesses defined by distances from the incident-side light-guiding surface IG and the emission-side light-guiding surface OG to the opposing light-guiding surface OP. Note that the step portion SP is shaped so as to create a difference in thickness of 2.5 mm or greater, for example, in the thickness direction of the light-guiding member 10, and as necessary, the connecting surface SS or the vicinity of the connecting surface SS may be painted black or be subject to surface texturing processing (sand printing). Further, for the connecting surface SS, for example, the connecting surface SS can be formed to have a shape that connects the incident-side light-guiding surface IG and the emission-side light-guiding surface OG with a taper angle of 3° to 10° with respect to the normal line direction of the emission-side light-guiding surface OG, for example. By configuring the connecting surface SS or the vicinity thereof as described above, the occurrence of stray light due to unintended reflection or the like of the external light or the video image light can be suppressed.

Further, for the light-guiding member 10 described above, from a different point of view, of the plurality of light-guiding surfaces, with respect to the incident-side light-guiding surface IG and the emission-side light-guiding surface OG that are adjacent to each other and that are disposed on the opposite side to the incident side of the external light (that is, the side closer to the observer), the light-guiding member 10 has a shape in which the emission-side light-guiding surface OG protrudes further than the incident-side light-guiding surface IG (that is, a shape in which the incident-side light-guiding surface IG is recessed further than the emission-side light-guiding surface OG).

As described above, the light transmitting member 50 is integrally fixed with the light-guiding member 10 to form the single light-guiding device 20, and is the member (the auxiliary optical block) that assists in the see-through function of the light-guiding member 10. The light transmitting member 50, which is a light transmitting portion, has a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is on an extended surface of the first surface S11 of the light-guiding member 10, the second transmission surface S52 is a curved surface that is joined to and integrated with the second surface S12, and the third transmission surface S53 is on an extended surface of the third surface S13 of the light-guiding member 10. In other words, the first surface S11 and the first transmission surface S51 are adjacent to each other, and similarly, the third surface S13 and the third transmission surface S53 are adjacent to each other, and both are aligned to be flush with each other and form a smooth surface.

The optical path of the video image light GL will be described below briefly with reference to FIG. 2. The light guiding member 10 causes the video image light GL from the projection lens LS to be incident, and guides the video image light GL toward the eye of the observer, by reflection and the like at the first to fifth surfaces S11 to S15. Specifically, the video image light GL from the projection lens LS is first incident on the fourth face S14 and reflected by the fifth face S15, is incident again from the inner side on the fourth surface S14 and is totally reflected, is incident on and totally reflected by the third surface S13, and is incident on and totally reflected by the first surface S11. The video image light GL totally reflected by the first surface S11 is incident on the second surface S12, is partially reflected while partially passing through the half mirror layer provided on the second surface S12, and is once more incident on and passes through the first surface S11, that is, passes through the first surface S11. The video image light GL that has passed through the first surface S11 is incident, as a substantially parallel luminous flux, on the eye of the observer or an equivalent position EY. In other words, the observer observes the image formed by the video image light GL as the virtual image.

Further, as described above, the light-guiding device 20 allows the observer to visually recognize the video image light using the light-guiding member 10, and also, due to the light-guiding member 10 and the light transmitting member 50 operating in conjunction, causes the observer to observe the external world image having little distortion. At this time, since the third surface S13 and the first surface S11 are substantially parallel to each other (diopter is approximately 0), almost no aberration or the like occurs in the external light. Further, similarly, the third transmission surface S53 and the first transmission surface S51 are flat surfaces that are substantially parallel to each other. Furthermore, since the third transmission surface S53 and the first surface S11 are the flat surfaces that are substantially parallel to each other, almost no aberration or the like occurs. As described above, the observer observes the external world image that has no distortion through the light transmitting member 50.

As described above, in the present embodiment, in the interior of the light-guiding member 10, the video image light from the image display device 80 is guided by being reflected five times from the first surface S11 to the fifth surface S15, including being totally reflected at least two times, as described above. As a result, both the display of the video image light and the see-through perspective that causes the external light to be visually recognized can be achieved, and aberration correction of the video image light GL can be performed.

Note that the configuration described above is the same in the second display device 100B illustrated in FIG. 1. This makes it possible to form images corresponding to the left and right eyes, respectively.

In the present embodiment, in the light-guiding device 20 that guides the video image light GL as described above, by providing the step by the step portion SP, as described above, the configuration is achieved that generates the difference between a thickness $h_1$ from the emission-side light-guiding surface OG to the opposing light-guiding surface OP and a thickness $h_2$ from the incident-side light-guiding surface IG to the opposing light-guiding surface OP. In other words, $h_1>h_2$. Thus, by reducing the size of the light-guiding member 10, it is possible to maintain a more compact shape that fits the head shape of the observer when widening the angle of view of the video image to be displayed.

In the case of the HMD having a configuration in which the light-guiding device is extended along the lateral direction (the horizontal direction), which is the direction in which the eyes are aligned side by side, and the video image light is guided from the ear side of the observer to the front of the eye, which includes the case as in the present embodiment, adjustment of the size of a light-guiding portion is particularly important. This is because if the HMD is too small, the face of the observer cannot fit, and if the HMD is too large, there are issues of design in terms of appearance and the like, and further, this leads to difficulties in wearing the HMD. In particular, when attempting to achieve a wide angle of view, the surface for reflecting the video image light becomes wider in the light-guiding member, and there is a tendency for the size of the light-guiding member, and for the size of the device as a whole, to increase.

In particular, in terms of size, a length LLc illustrated in FIG. 2, that is, the length from the entrance to the exit of the video image light GL in the light-guiding member 10, is problematic. More specifically, in order to maintain the appropriate size as the light-guiding member 10, it has been found that a distance from a reference incident position to a reference emission position of the video image light GL, as exemplified by the length LLc, is approximately 54 mm or less, and even in the case of the wide angle of view, it is desirable to suppress the distance to this approximate length. However, when attempting to achieve the wide angle of view, first, of the light-guiding member 10, with respect to a light emission side close to the eye, from the point of view of maintaining the angle of view, and securing the eye ring, an eye relief and the like, it is unavoidable to increase the size to a certain extent. Furthermore, from the point of view of the see-through perspective, the shape of the reflective surface is also limited on the light emission side. Therefore, it is considered to be difficult to have a configuration for suppressing an increase in size due to a wider angle of view. In other words, for the thickness $h_1$ on the light emission side, the size required for the widening of the angle of view is determined, and changes are difficult. Therefore, in the present embodiment, by providing the difference in thickness $h_2$ on the light incident side with respect to the thickness $h_1$ on the light emission side, the configuration is attained in which the length of the light-guiding member 10 corresponding to the length LLc falls within an appropriate range even when widening the angle of view. Note that in the following description, the length of the light-guiding member 10 corresponding to the length LLc is referred to as a light guide length, and the light guide length is defined appropriately.

Hereinafter, with reference to the conceptual plan cross-sectional view illustrated in FIG. 3 and the like, by following a optical path of a principal ray component PRc of a component light GLc that is a central ray of the video image light GL, the size of the light-guiding device 20 of the virtual image display device 100, and more specifically, the light guide length of the light-guiding member 10 will be considered.

Figure 3:
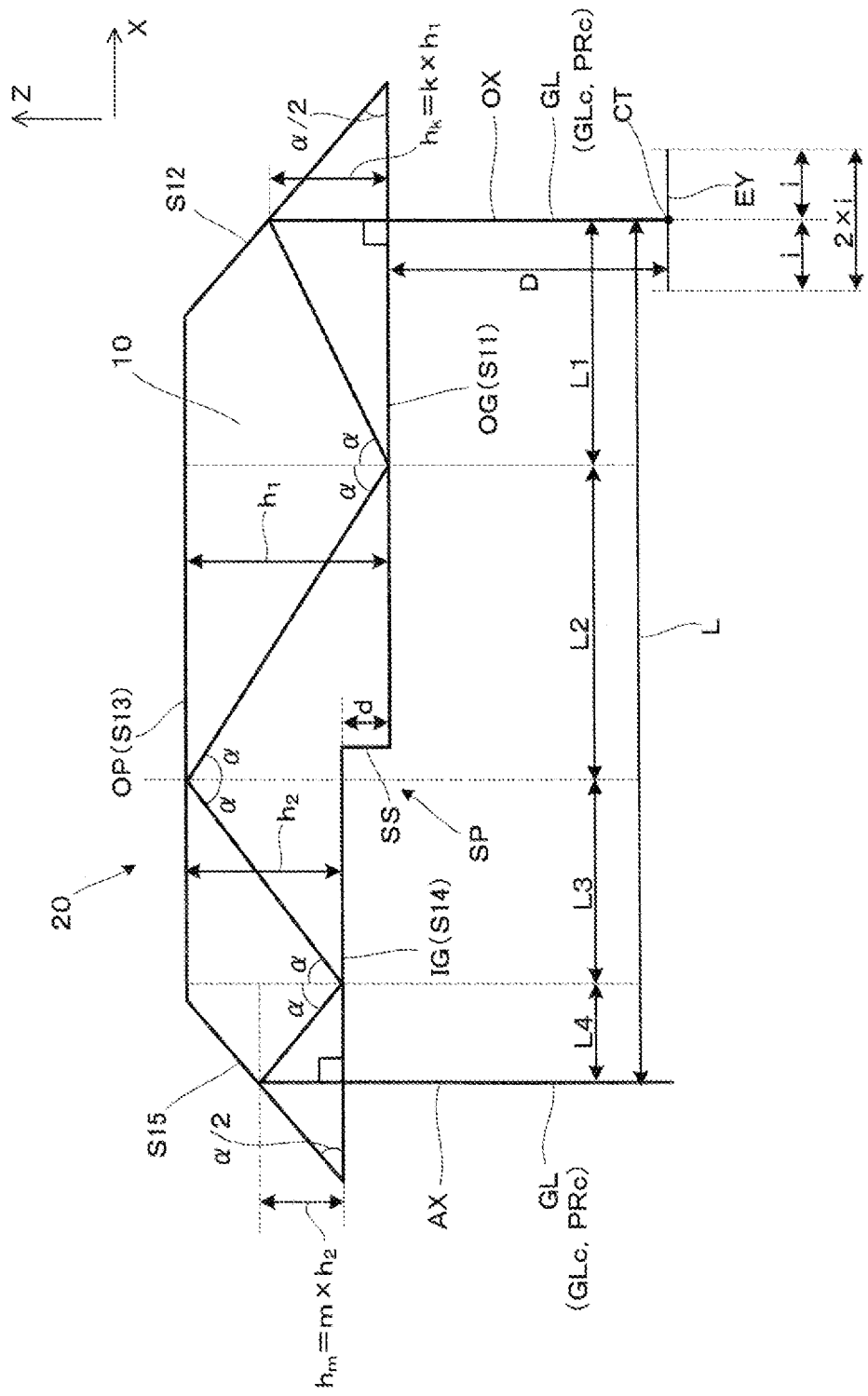
FIG. 3 is a conceptual plan cross-sectional view for considering a configuration of a light-guiding device in the virtual image display device.

Here, as an assumption, in the light-guiding device 20 or the light-guiding member 10 illustrated in FIG. 3, the following approximations are used for simplifying the description.

First, with respect to the first to fifth surfaces S11 to S15 that are the plurality of light-guiding surfaces configuring the light-guiding member 10, the surface is approximated by a flat surface. In particular, of these, the first surface S11, which is the emission side light-guiding surface OG, and the third surface S13, which is the opposing light-guiding surface OP facing the first surface S11, are flat surfaces that are parallel to each other. Furthermore, the fourth surface S14, which is the incident light-guiding surface IG, and the third surface S13, which is the opposing light-guiding surface OP facing the fourth surface S14, are also flat surfaces that are parallel to each other. In other words, the fourth surface S14 is essentially a free form surface, that is, formed on the free form surface portion of the light-guiding member 10, but is considered to be a flat surface in the example in FIG. 3. Note that, in the case of the above assumption, the first surface S11, the third surface S13, and the fourth surface S14 are parallel to each other. Furthermore, with respect to the second surface S12 and the fifth surface S15, an angle formed by the first surface S11 and the second surface S12 and an angle formed by the fourth surface S14 and the fifth surface S15 are equal to each other.

Next, with respect to the video image light GL, the component PRc of the principal ray of the component light GLc as the center light passes along an optical path that is the same as the incident-side optical axis AX and is vertically incident on the fourth surface S14 that is the flat surface. In this case, given the conditions of the above-described first to fifth surfaces S11 to S15, the component PRc of the principal ray passes through each of the surfaces S11 to S15, and is emitted in a vertical direction from the first surface S11. In addition, in this case, the reflection angle of the component PRc of the principal ray with respect to the first surface S11, the third surface S13, and the fourth surface S14 is always the same. Here, this reflection angle is referred to as a reflection angle α. Note that in this case, the angle formed by the first surface S11 and the second surface S12 is α/2. Also, when the component PRc is emitted, the optical path of the component PRc is the same as a visual axis OX of the observer and passes through a center point CT of the eye ring, that is, through a center point of an ideal pupil of the observer.

Here, as illustrated, a normal line direction of the first surface S11, the third surface S13, and the fourth surface S14 is defined as a Z direction, and, of the in-plane direction of the first surface S11, the third surface S13, and the fourth surface S14, the horizontal direction in which the eyes are aligned side by side is referred to as an X direction. In this case, the Z direction is a direction that defines a distance from the first surface S11 or the fourth surface S14 to the third surface S13, and this is the thickness direction of the light-guiding member 10. In other words, as illustrated, the thickness $h_1$ from the emission-side light-guiding surface OG (the first surface S11) to the opposing light-guiding surface OP (the third surface S13) and the thickness $h_2$ from the incident-side light-guiding surface IG (the fourth surface S14) to the opposing light-guiding surface OP are defined by the distances in the Z direction.

Further, in the above-described assumption, with respect to the definition of a light guide length L of the light-guiding member 10, a reference length is as illustrated that is a length from the reference incident position of the component PRc of the principal ray to the reference emission position. Specifically, the distance in the X direction from the incident-side optical axis AX to the visual axis OX is defined as the light guide length L. In FIG. 3, the light guide length L is divided into four lengths L1 to L4 based on reflection positions of the component PRc of the principal ray. In other words, L=L1+L2+L3+L4 . . . (1). Further, in addition to the above, as illustrated, for the component PRc of the principal ray, a distance from a reflection point of the second surface S12 to an emission point of the first surface S11 is defined as a distance $h_k$, and a distance from an incident point of the fourth surface S14 to a reflection point of the fifth surface S15 is defined as a distance $h_m$. Here, $h_k = k \times h_1$ and $h_m = m \times h_2$. In other words, the distances $h_k$ and $h_m$ are indicated as ratios with respect to the thicknesses $h_1$ and $h_2$.

Note that, normally, since the component PRc of the principal ray is located near the center or center of the entire luminous flux of the video image light GL, the reflection point of the second surface S12 and the reflection point of the fifth surface S15 are preferably roughly around the center of each surface. In other words, numerical values k and m indicating the ratio of the positions of each of the surfaces are preferably a value 0.5 that is a center of a range from 0 to 1, or in the vicinity of 0.5. As a specific example, it is assumed that k=0.6 approximately, and m=0.7 approximately.

Based on each of the values defined as described above, if a trigonometric ratio from the drawings is considered, the four lengths L1 to L4 are respectively:

$$L1 = h_k \times \tan \alpha = k \times h_1 \times \tan \alpha \quad (2a)$$

$$L2 = h_1 \times \tan \alpha \quad (2b)$$

$$L3 = h_2 \times \tan \alpha \quad (2c), \text{ and}$$

$$L4 = h_m \times \tan \alpha = m \times h_2 \times \tan \alpha \quad (2d).$$

Thus, by substituting Equations (2a) to (2d) into Equation (1) and re-arranging Equation (1), the following is obtained: $L = L1+L2+L3+L4 = \{(1+k)h_1 + (1+m)h_2\} \times \tan \alpha$ . . . (3). It can be seen from the right-hand side of Equation (3) that the value of the light guide length L can be reduced by reducing the thickness $h_2$. Furthermore, it can also be seen that the light guide length L can be reduced by any order. Note that, of the right-hand side, it is considered that other values cannot be changed as much as the thickness $h_2$.

For example, as described above, the thickness $h_1$ on the light emission side is determined according to the value of the angle of view (FOV), or the relationship with the eye ring indicating the diameter by i or 2×i in the drawings or the eye relief illustrated by D in the drawings, and is determined in accordance with these values that determine the configuration of the virtual image display device 100. In other words, when the value of the thickness $h_2$ is reduced, the eye ring diameter i, the eye relief D, or the angle of view have to be reduced.

Further, if the value of the reflection angle α is reduced, for example, all of the reflection conditions may not be satisfied. Note that, as described above, if the numerical values k and m are made smaller, a reflection region on each of the surfaces of the video image light GL becomes smaller.

In contrast to the above, for the thickness $h_2$, it is conceivable that an optical effect of reducing the numerical value is less. For example, by making appropriate the position and size of the step generated due to the difference between the thickness $h_2$ and the thickness $h_1$, the size of the emission-side light-guiding surface OG (the first surface S11) and of the opposing light-guiding surface OP (the third surface S13) can be sufficiently secured, and thus, the see-through perspective can also be secured in which the video image light is caused to pass through the emission light-guiding surface OG and the opposing light-guiding surface OP and the video image light and the external light are caused to be simultaneously recognized. Focusing on this point, in the present application, by reducing the thickness $h_2$ with respect to the thickness $h_1$, it is possible to suppress an increase in the light guide length L when widening the angle of view of the video image.

Figure 4:
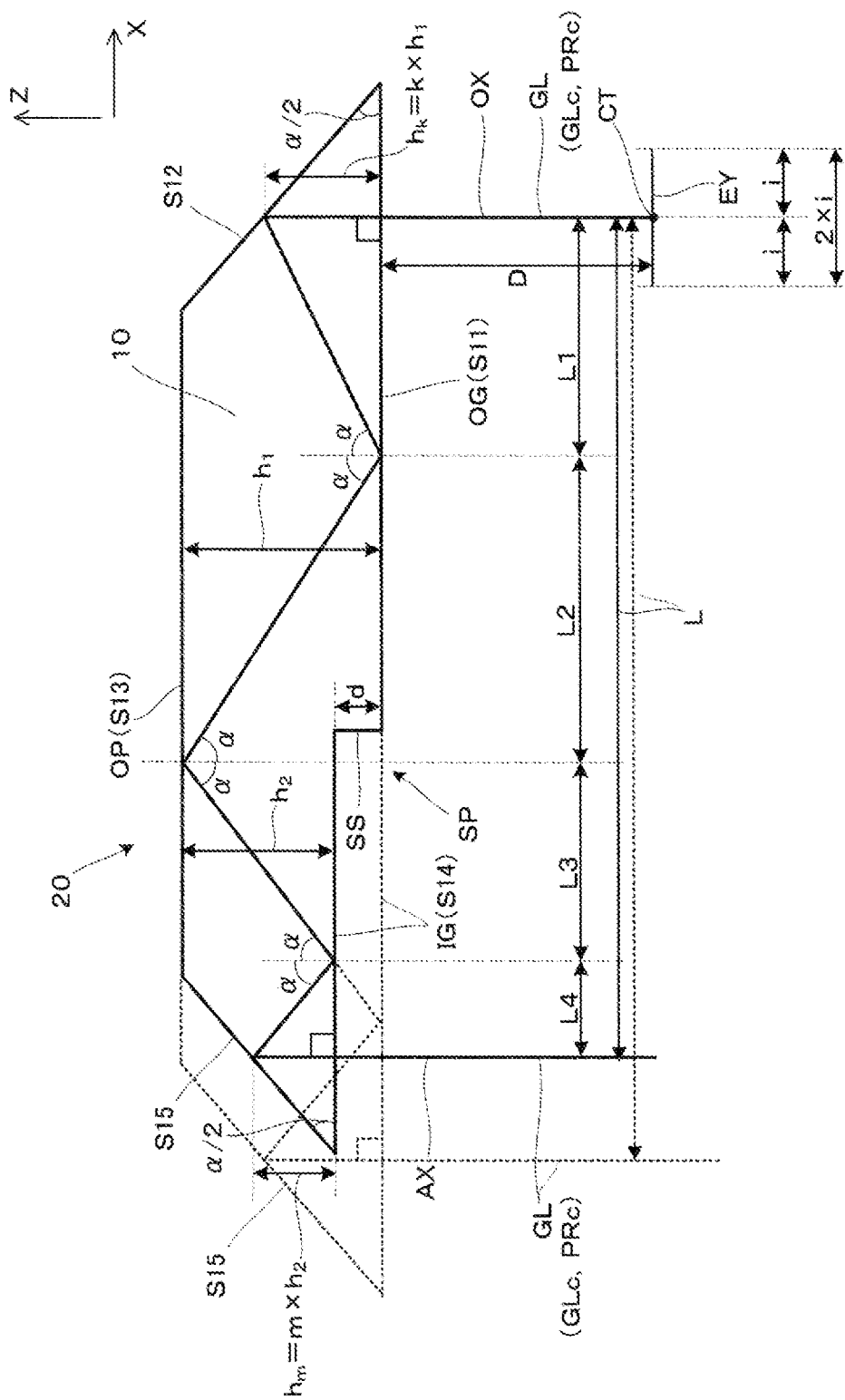
FIG. 4 is a conceptual diagram for making a comparison of a configuration of the light-guiding device.

FIG. 4 is a schematic diagram for comparing the configuration of the light-guiding device 20 or the light-guiding member 10, and corresponds to FIG. 3. For example, in the light-guiding member 10 exemplified in FIG. 3, the optical path of the component PRc of the principal ray in the light-guiding member 10 in a case in which the difference between the thickness $h_2$ and the thickness $h_1$ is not provided is indicated by dashed lines in FIG. 4. Compared to the case in FIG. 3, which is indicated by solid lines, it can be seen that the light guide length L is increased.

Below, a description will be made with reference to a graph in FIG. 5. This graph illustrates an example of the relationship between the thickness ratio $h_2/h_1$ and the light guide length L. The horizontal axis is the thickness ratio $h_2/h_1$ (where units of each thickness are mm), and the vertical axis is the light guide length L (where the unit is mm). Note that each of curves A1 to A3, B1 to B3, and C1 to C3 indicates a case in which the angle of view (FOV) or a refractive index nd is different. First, when the above Equation (3) is modified, $$\frac{h_2}{h_1} = \frac{L}{\tan \alpha * (1+m)h_1} - \frac{1+k}{1+m} = \frac{L*\tan(90° - \alpha)}{(1+m)h_1} - \frac{1+k}{1+m} \quad (4)$$

can be used. Here, the thickness $h_1$ remains on the right-hand side, but as described above, the thickness $h_2$ is fixedly determined by the angle of view (FOV), the eye ring diameter i, and the eye relief D, and here, it is assumed that the eye ring diameter i and the eye relief D other than the angle of view (FOV) are not changed, and when the angle of view (FOV) is determined, the thickness $h_1$ is determined. Furthermore, it is conceivable that, given that the light guide length L is approximately 54 mm or less, that k=0.6 approximately and m=0.7 approximately, and that the reflection angle α satisfies the total reflection conditions at the refractive index nd, the ratio of the thickness $h_2/h_1$ is preferably the value on the right-hand side of the above Equation (4) or a value that is equal to or less than the value of the right-hand side of the above Equation (4).

Note that, as described above, for the items illustrated in an approximated manner in FIG. 3 and the like, the plurality of light-guiding surfaces configuring the light-guiding member 10 are all treated as the flat surfaces, and the principal ray is vertically incident on those flat surfaces, for example. Therefore, in an actual optical system, a free form surface may be used or an incident angle may also be applied. However, with respect to a calculation of how long the light guide length approximately is, these differences in shape and angle are considered to be items that are conceived as tolerable errors, or items that can be corrected. For example, with respect to the incident angle or the like, in order to account for differences between light rays and the total reflection conditions associated therewith, or the inclinations of the incident-side optical axis AX and the visual axis OX, the eye ring diameter i, and the like, in each of the above-described equations, instead of the reflection angle α described above, for example, it is conceivable to use an angle θ1 that is defined as below:

$$\theta_1 = 11.6 + \operatorname{asin} \frac{1}{n_d} \quad (5)$$

Figure 5:
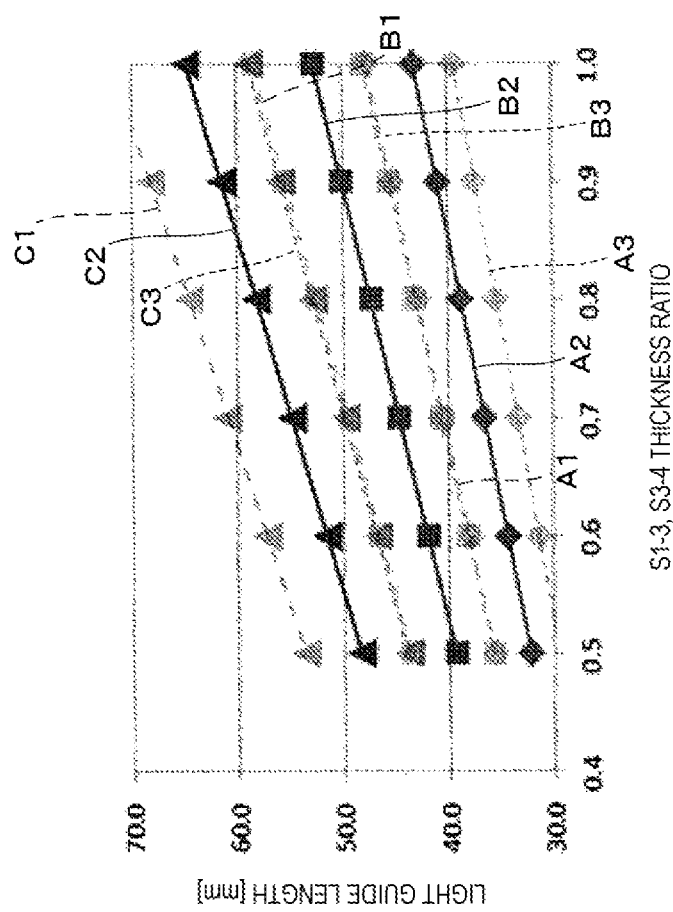
FIG. 5 is a graph illustrating a relationship between a thickness ratio and a light guide length.

Each of the curves A1 to A3, B1 to B3, and C1 to C3 in FIG. 5 indicates, as the above conditions, a curve of a boundary satisfying each condition when the angle θ1 is used instead of k=0.6, m=0.7, and sinα, for each angle of view (FOV) and the refractive index nd. For example, the curves A1 to A3 indicate the curves of the boundaries when the refractive index nd=1.50, 1.55, and 1.60 in a case in which the horizontal angle of view of 25° is applied as the angle of view. Similarly, the curves B1 to B3 indicate cases for the horizontal angle of view of 35° and the refractive index nd=1.50, 1.55, and 1.60, and the curves C1 to C3 indicate cases for the horizontal angle of view of 45° and the refractive index nd=1.50, 1.55, and 1.60, respectively. From the graph, it is conceivable that, for example, if the thickness ratio $h_2/h_1$ is approximately 0.5, that is, when the thickness $h_2$ is approximately half the thickness $h_1$, the light guide length L can be made to be approximately 54 mm even in a display with a wide angle of view in which the horizontal angle of view is approximately 45°. Furthermore, from the graph, although depending on the value of the refractive index nd, that is, depending on the material of the light-guiding member 10, it can be seen that when the horizontal angle of view is 25° or greater, it is necessary for the thickness $h_2$ to be smaller than the thickness $h_1$. More specifically, for example, when the refractive index is low as in the case of the refractive index of nd=1.50, $h_2<h_1$ becomes necessary if the horizontal angle of view exceeds approximately 32°, and further, $h_2<h_1$ is necessary if the horizontal angle of view exceeds approximately 40°, regardless of the refractive index.

Note that, if the point of view is changed, as one limitation relating to the thickness $h_2$, the above consideration can also be said to be related to an upper limit of the thickness $h_2$ or an upper limit of the thickness ratio $h_2/h_1$.

Figure 6:
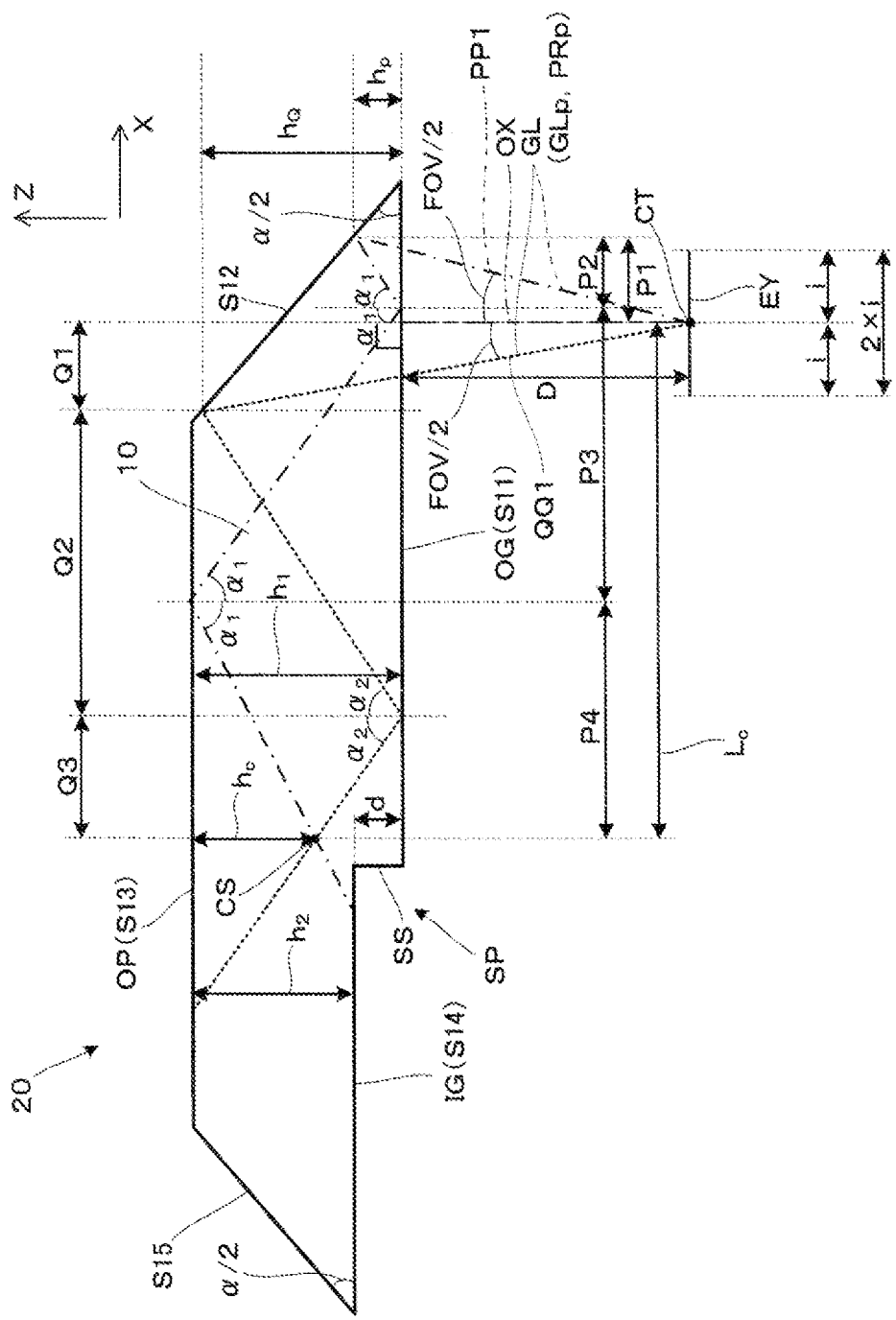
FIG. 6 is a conceptual diagram for considering a configuration of the light-guiding device from the perspective of an optical path of ambient light.

Next, as another limitation relating to the thickness $h_2$, the configuration of the light-guiding device 20 is considered with reference to FIG. 6 and the like, from the point of view of the optical path of the component light GLp on the peripheral side of the video image light GL illustrated in FIG. 2.

As described above, from the point of view that the component light GLp determines the angle of view (FOV) of the video image light GL, it is an important matter to consider the optical path of the component light GLp in the light-guiding member 10. For example, when the step portion SP is provided in order to reduce the thickness $h_2$, it is assumed that a range through which each component light of the video image light GL can pass is secured in the vicinity of the step portion SP. In other words, it is necessary to have a shape or configuration in which the step portion SP does not overlap with the range through which the video image light GL passes, so that the video image light GL is not deflected and blocked by the step portion SP. Here, in order to take such considerations into account, the component light GLc, which is the ambient light of the video image light GL, is represented by the component PRp of the principal ray of the component light GLp, and desirable conditions for the optical path thereof are considered.

The step portion SP, which is a location at which the incident-side light-guiding surface IG and the emission-side light-guiding surface OG are adjacent to each other, is the difference between the thickness $h_1$ and the thickness $h_2$ generated by a step d in the thickness direction (the Z direction) in the connecting surface SS. Although dependent on the setting of each component and the refractive index of the material to be adopted, for example, when the angle of view (FOV) is approximately 28°, and the thickness $h_1$ is approximately 13 mm, a value of the step d is approximately 2.5 mm, or equal to or greater than 2.5 mm, and, as a result, the light guide length L can be set within a desired range.

Figure 7:
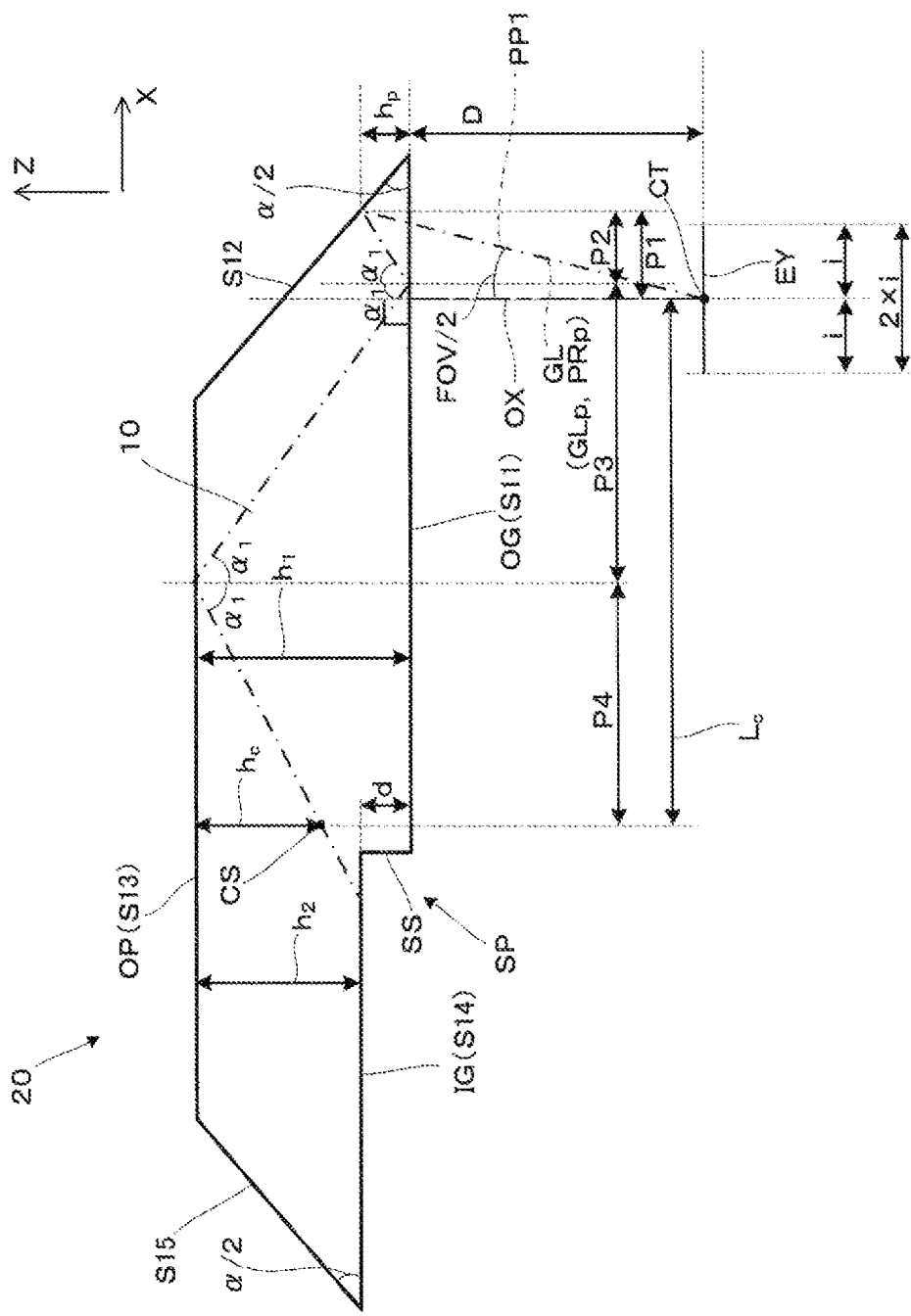
FIG. 7 is a conceptual diagram obtained by extracting a part of FIG. 6.
Figure 8:
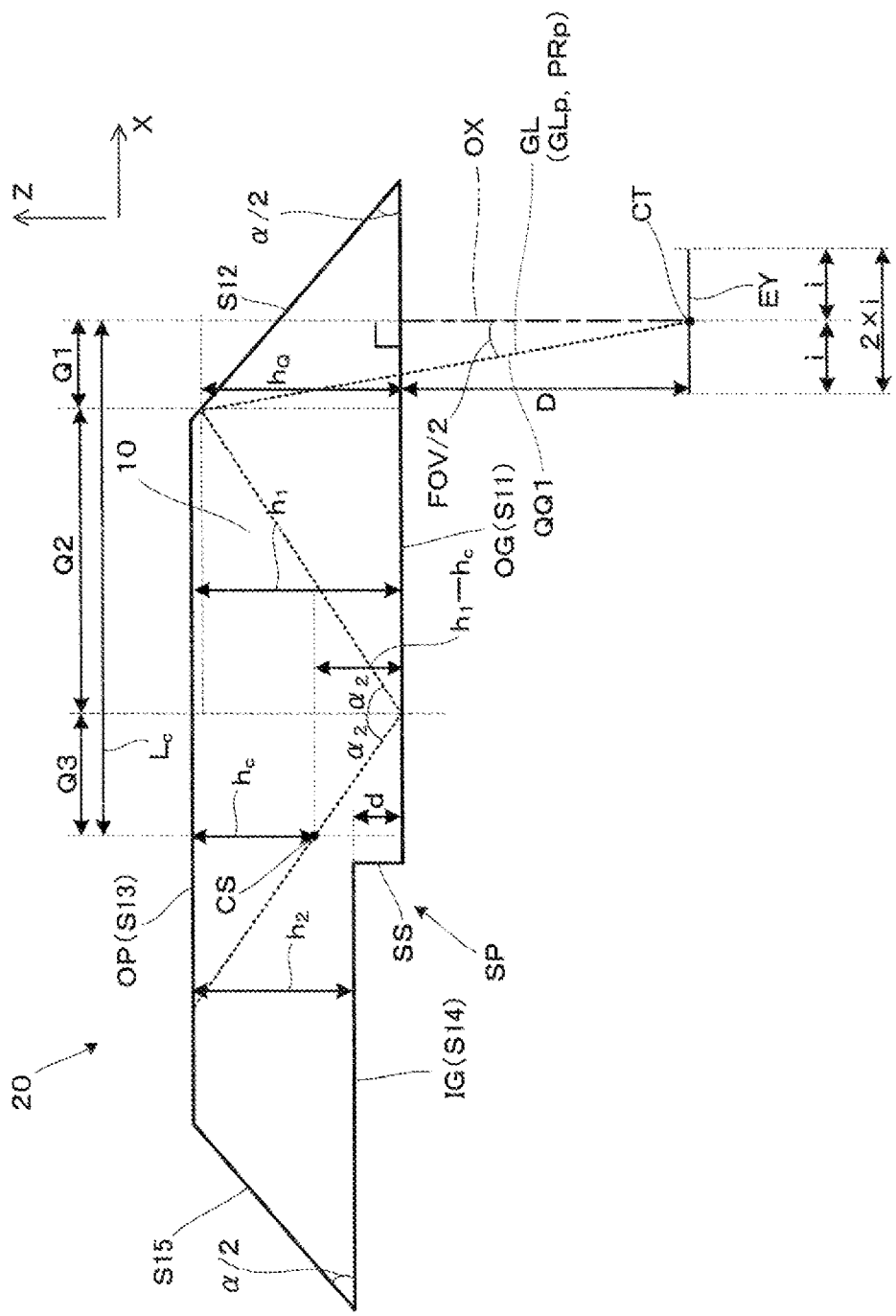
FIG. 8 is a conceptual diagram obtained by extracting another part of FIG. 6.

FIG. 6 is a conceptual plan cross-sectional view for considering the configuration of the light-guiding device 20, that is, the light-guiding member 10, with respect to the optical path of the component PRp of the principal ray of the component light GLc, which is the ambient light, and FIG. 6 corresponds to FIG. 3. Further, FIG. 7 is an extracted view of a portion of FIG. 6, and FIG. 8 is an extracted view of another part of FIG. 6.

Here, of the component PRp to be considered, it is assumed that there is a component PP1 that is indicated by a one dot chain line in the drawings and that is a component relating to the light emission side (the positive X side), or in other words, to the angle of view with respect to the nose side of the observer, and a component QQ1 that is indicated by a dashed line in the drawings and that is a component relating to the light incident side (the negative X side), or in other words, to the angle of view with respect to the ear side of the observer. Note that these components PP1 and QQ1 correspond to the principal rays of the components emitted from the most peripheral one end and the other end of the image surface IP of the image display device 80 illustrated in FIG. 2.

Furthermore, here, as illustrated, of intersection points (a plurality of intersection points) of the component PP1 and the component QQ1, the intersection point closest to the step portion SP, which is the adjacent location, is referred to as an intersection point CS. One criterion is that the intersection point CS does not overlap with the step portion SP. Therefore, here, a distance from the intersection point CS in the thickness direction (the Z direction) to the opposing light-guiding surface OP (the third surface S13) is defined as a distance $h_c$, and it is a condition of securing the optical path of the component light GLp that the distance $h_c$ be a reference that defines the lower limit of the thickness $h_2$, that is, that the value of the thickness $h_2$ be greater than the value of the distance $h_c$ from the intersection point CS to the opposing light-guiding surface OP.

Below, the optical paths of the component PP1 and the component QQ1 will be considered in reverse from the eye position EY until they reach the intersection point CS. Further, here, the distance from the intersection point CS to the visual axis OX in the X direction (the horizontal direction) is defined as a distance $L_c$. Furthermore, as illustrated, a total reflection angle of the component PP1 in the light-guiding member 10 is an angle $\alpha_1$ (that is, the reflection angle $\alpha_1$), and a total reflection angle of the component QQ1 is an angle $\alpha_2$ (that is, the reflection angle $\alpha_2$).

Given the above assumptions, the following is a summary of a method for calculating, for the component PP1 and the component QQ1, the distance $h_c$ by representing the distance $L_c$ with each of the numerical values determined above.

First, with reference to FIG. 7, the securing of the angle of view (FOV) on the nose side, that is, the component PP1, will be considered. The component PP1 extends from the center point CT of the eye ring, which is the center of the eye position EY, to the positive X side with respect to the visual axis OX in a direction inclined by an angle FOV/2, is incident from the first surface S11, is turned back by reflection by the first surface S12, is reflected by the emission-side light-guiding surface OG (the first surface S11), and is reflected by the opposing light-guiding surface OP (the third surface S13), thus reaching the intersection point CS. In the drawings, the distance $L_c$ is divided into four lengths P1 to P4, taking reflection positions of the component PP1 as reference. In other words, $L_c=-P1+P2+P3+P4 \ldots$ (6). Here, the four lengths P1 to P4 are, respectively:

$$P1=(h_p+D) \times \tan(FOV/2) \qquad (7a)$$

$$P2=h_p \times \tan \alpha_1 \qquad (7b)$$

$$P3=h_1 \times \tan \alpha_1 \qquad (7c), \text{ and}$$

$$P4=h_c \times \tan \alpha_1 \qquad (7d),$$

when the distance from the incident point of the first surface S11 to the reflection point of the second surface S12 (corresponding to a distance from the reflection point of the second surface S12 to an emission point of the first surface S11 when following the order of the optical path) is a distance $h_p$, and if a trigonometric ratio from the drawings is considered. Note that the distance $h_p$ is appropriately determined by the value of the distance $h_k$ in FIG. 3, the shape of the luminous flux, and the like. In the above description, the distance $h_c$ to be calculated is only included in the length P4, and the lengths P1 to P3 are determined by other numerical values not including the distance $h_c$. Note that the eye relief D is the same as described above.

Next, with reference to FIG. 8, the securing of the angle of view (FOV) on the ear side, that is, the component QQ1, will be considered. The component QQ1 extends from the center point CT of the eye ring, which is the center of the eye position EY, to the negative X side with respect to the visual axis OX in a direction inclined by the angle FOV/2, is incident from the first surface S11, is turned back by reflection by the first surface S12, and is reflected by the emission light-guiding surface OG (the first surface S11), thus reaching the intersection point CS. In other words, the configuration differs from the case of the component PP1 illustrated in FIG. 7 and the like in that the intersection point CS is reached before reaching the opposing light-guiding surface OP (the third surface S13). In FIG. 8, the distance $L_c$ is divided into three lengths Q1 to Q3, taking reflection positions of the component QQ1 as reference. That is, $L_c=Q1+Q2+Q3 \ldots$ (8). Here, the three lengths Q1 to Q3 are respectively:

$$Q1=(h_Q+D) \times \tan(FOV/2) \qquad (9a)$$

$$Q2=h_Q \times \tan \alpha_2 \qquad (9b), \text{ and}$$

$$Q3=(h_1-h_c) \times \tan \alpha_2 \qquad (9c),$$

when the distance from the incident point of the first surface S11 to the reflection point of the second surface S12 (corresponding to a distance from the reflection point of the second surface S12 to an emission point of the first surface S11 when following the order of the optical path) is a distance $h_Q$, and if a trigonometric ratio from the drawings is considered. Note that the distance $h_Q$ is appropriately determined by the value of the distance $h_k$ in FIG. 3, the shape of the luminous flux, and the like. In the above description, the distance $h_c$ to be calculated is only included in the length Q3, and the lengths Q1 and Q2 are determined by other numerical values not including the distance $h_c$.

From the above, with respect to the distance $L_c$, first, from the Equations (6) and (8) above:

$$L_c=-P1+P2+P3+P4=Q1+Q2+Q3 \qquad (10).$$

From this, further, by substituting the above Equations (7a) to (7d) and (9a) to (9c) in the middle and right-hand sides of the above Equation (10), taking into consideration that the distance $h_c$ is only included in the lengths P4 and Q3, when the distance $h_c$ is re-arranged in the middle and right-hand sides, it is possible to obtain the conditions that the distance $h_c$ should satisfy.

In the present embodiment, with respect to the distance $h_c$ determined in the manner described above, the thickness $h_2$ satisfies $h_2 \geq h_c \ldots$ (11). This is a desirable condition to ensure that the intersection point CS does not overlap with the step portion SP. Furthermore, referring to the thickness ratio $h_2/h_1$, it is preferable that $h_2/h_1 \geq h_c/h_1 \ldots$ (12). For the right-hand side of the above Equation (12), when the angle of view (FOV), the eye relief D, and further, the ring diameter i are considered, for the thickness ratio $h_2/h_1$, it is conceivably preferable to satisfy $h_2/h_1 \geq 0.5 \ldots$ (13).

Note that in the above consideration, if the point of view is changed, a lower limit of the thickness $h_2$ or a lower limit of the thickness ratio $h_2/h_1$ can also be said to be another limitation relating to the thickness $h_2$.

As described above, the virtual image display device 100 according to the present embodiment includes the image display device 80 that is the video image element configured to display an image, and the light-guiding member 10 configured to guide the video image light GL from the image display device 80 by reflecting and transmitting the video image light GL at the first to fifth surfaces S11 to S15 that are the plurality of light guiding surfaces. With respect to the incident-side light-guiding surface IG (the fourth surface S14) and the emission-side light-guiding surface OG (the first surface S11) that are adjacent to each other, and the opposing light-guiding surface OP (the third surface S13) facing the incident-side light-guiding surface IG and the emission-side light-guiding surface OG, the thickness $h_1$ from the incident-side light-guiding surface IG to the opposing light-guiding surface OP is smaller than the thickness $h_2$ from the emission-side light-guiding surface OG to the opposing light-guiding surface OP.

In the above-described virtual image display device 100, by utilizing the difference in thickness provided at the location described above among the plurality of light-guiding surfaces configuring the light-guiding member 10, the light-guiding member 10 can be made more compact, and, when widening the angle of view, a more compact shape that fits the head of the observer can be maintained.

Example 1

Below, a specific example (Example 1) of the virtual image display device according to the present embodiment will be described with reference to FIG. 9 and the like.

Figure 9:
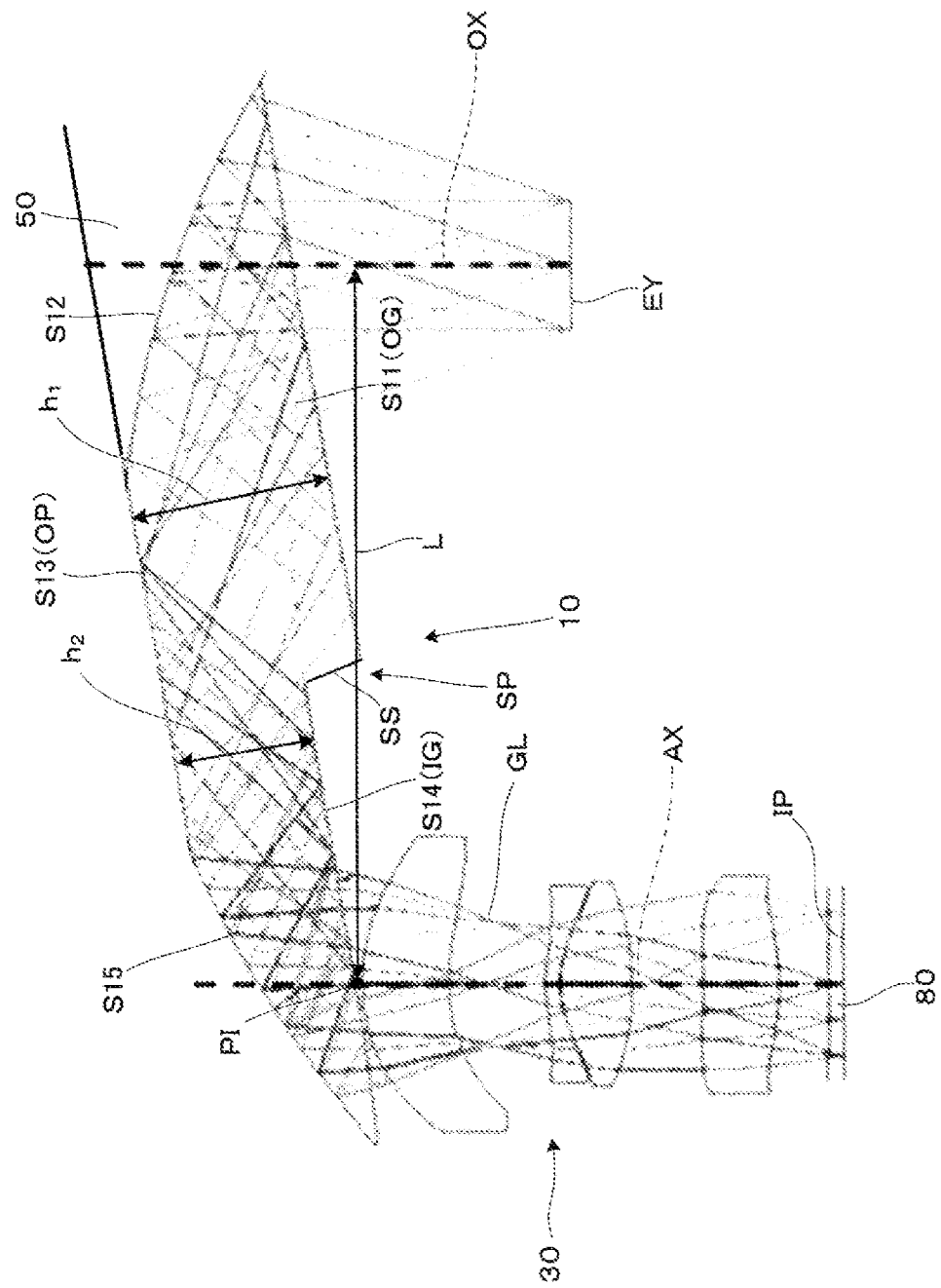
FIG. 9 is a plan cross-sectional view illustrating the virtual image display device of Example 1.

The virtual image display device illustrated in the plan cross-sectional view in FIG. 9 is a more specific aspect of the virtual image display device 100 exemplified in the present embodiment, and FIG. 9 is a diagram corresponding to FIG. 2. Also, FIG. 10 is a graph illustrating a relationship between the thickness ratio $h_2/h_1$ and the light guide length L of the light-guiding member 10 according to Example 1.

Here, as illustrated in FIG. 9, the light guide length L is defined by the distance from an incident point PI in the light-guiding member 10 (or the light-guiding device 20) of the incident-side optical axis AX, which is the optical axis of the projection optical system 30, to the optical axis OX. Furthermore, the light guide length L is intended to be approximately 50 mm. Note that in FIG. 10, the horizontal axis indicates the light guide length L, and the vertical axis indicates the thickness ratio $h_2/h_1$.

In the above description, in Example 1, the horizontal angle of view (FOV) is 35°, and the refractive index nd is 1.50. Furthermore, in Example 1, the light-guiding member 10 is configured by a value indicated by a point PT1 in FIG. 10. In other words, the light guide length L is set to the target of approximately 50 mm and the thickness ratio $h_2/h_1$ is set to be 0.69.

Figure 10:
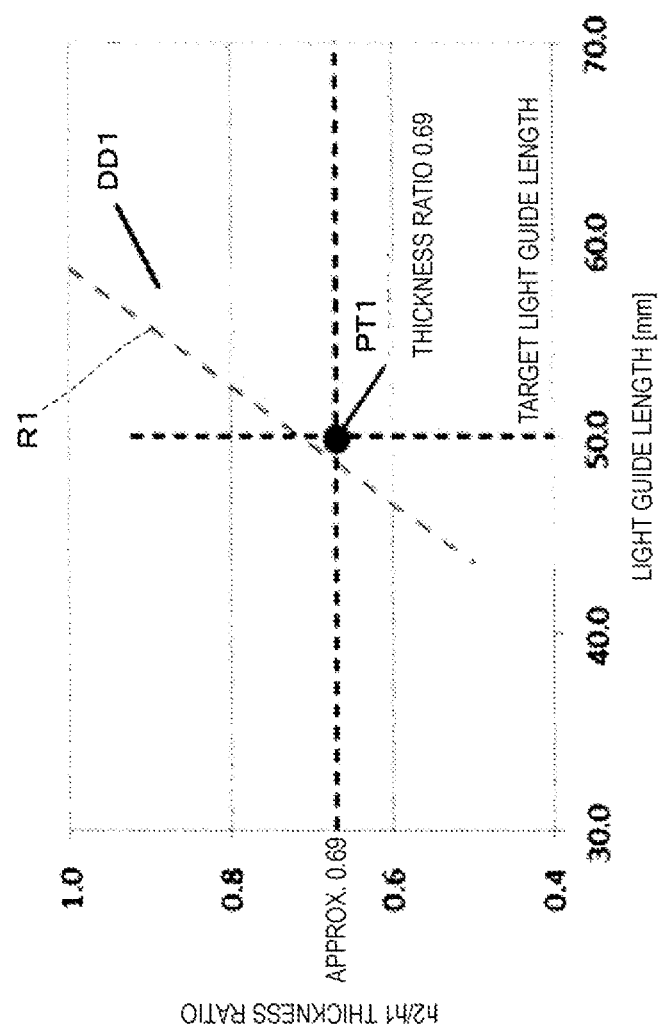
FIG. 10 is a graph illustrating a relationship between a thickness ratio and a light guide length for Example 1.

Here, in the above Equation (4), when k=0.6 and m=0.7, and, further, the angle $\theta_1$ of the above Equation (5) is used instead of the angle α, and the refractive index nd=1.50, a tolerable range for the thickness ratio $h_2/h_1$ is a region DD1 demarcated by a straight line R1 in FIG. 10. In this case, the maximum value of $h_2/h_1$ is approximately 0.73 when L=50 mm. Therefore, in the case of Example 1,in which $h_2/h_1$=0.69, these conditions, that is, the conditions relating to the above Equation (4) and the like, are satisfied. Further, the requirements of the above Equation (13) are also satisfied when $h_2/h_1$=0.69. In other words, the thickness ratio $h_2/h_1$ satisfies both requirements for the upper and lower limits.

As described above, Example 1 is an aspect in which reliable image formation can be secured while maintaining a more compact shape that fits the head shape of the observer, in a wide angle of view with a horizontal angle of view (FOV) of 35°.

Example 2

Next, a specific example (Example 2) of the virtual image display device according to the present embodiment will be described with reference to FIG. 11.

Figure 11:
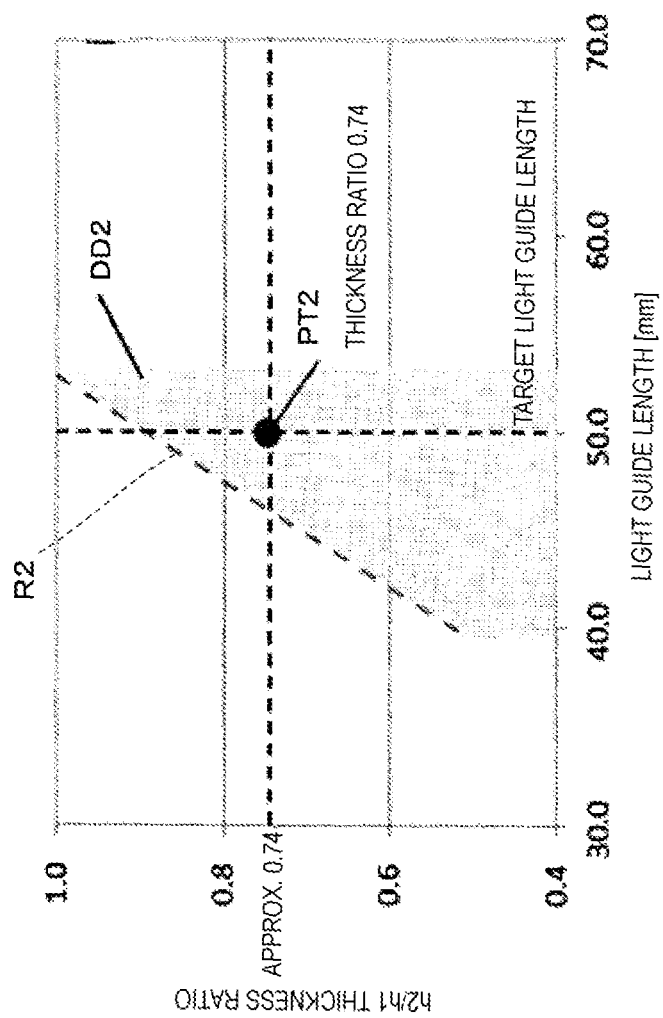
FIG. 11 is a graph illustrating a relationship between a thickness ratio and a light guide length for Example 2.

FIG. 11 is a graph illustrating the relationship between the thickness ratio $h_2/h_1$ and the light guide length L of the light-guiding member 10 of Example 2, and corresponds to FIG. 10. Note that the configuration and the like of the light-guiding member 10 are the same as those illustrated in FIG. 9 of Example 1 with only some difference in shape, and thus illustration of the configuration is omitted.

With respect to the above description, in Example 2, the horizontal angle of view (FOV) is 35°, and the refractive index nd is 1.55. Furthermore, in Example 2, the light-guiding member 10 is configured by a value indicated by a point PT2 in FIG. 11. In other words, the light guide length L is set to the target of approximately 50 mm and the thickness ratio $h_2/h_1$ is set to be 0.74.

Here, in the above Equation (4), when k=0.6 and m=0.7, and, further, the angle $\theta_1$ of the above Equation (5) is used instead of the angle α, and the refractive index nd=1.55, a tolerable range for the thickness ratio $h_2/h_1$ is a region DD2 demarcated by a straight line R2 in FIG. 11. In this case, the maximum value of $h_2/h_1$ is approximately 0.9 when L=50 mm. Therefore, in the case of Example 2, in which $h_2/h_1$=0.74, these conditions, that is, the conditions relating to the above Equation (4) and the like, are satisfied. Further, when $h_2/h_1$=0.74, the requirements of the above Equation (13) are also satisfied. In other words, the thickness ratio $h_2/h_1$ satisfies both requirements for the upper and lower limits.

As described above, Example 2 is an aspect in which reliable image formation can be secured while maintaining a more compact shape that fits the head shape of the observer, in a wide angle of view with a horizontal angle of view (FOV) of 35°.

Example 3

Next, a specific example (Example 3) of the virtual image display device according to the present embodiment will be described with reference to FIG. 12.

Figure 12:
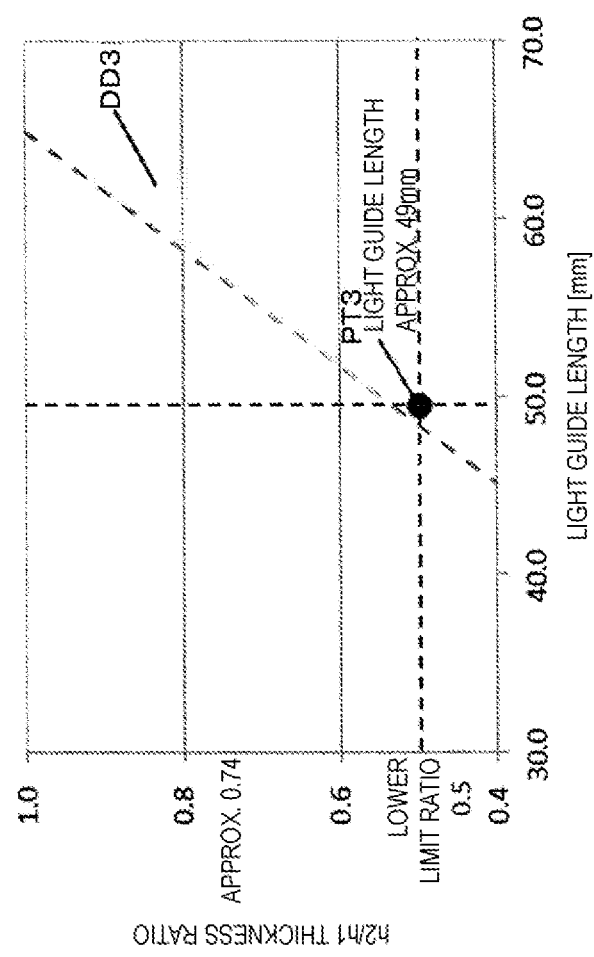
FIG. 12 is a graph illustrating a relationship between a thickness ratio and a light guide length for Example 3.

FIG. 12 is a graph showing the relationship between the thickness ratio $h_2/h_1$ and the light guide length L of the light-guiding member 10 relating to Example 3, and corresponds to FIG. 10 and FIG. 11. Note that the configuration and the like of the light-guiding member 10 are the same as those illustrated in FIG. 9 of Example 1 with only some difference in shape, and thus illustration of the configuration is omitted.

In the above, in Example 3, the horizontal angle of view (FOV) is 45°, and the refractive index nd is 1.55. Furthermore, in Example 3, the light-guiding member 10 is configured by a value indicated by a point PT3 in FIG. 12. In other words, the light guide length L is set to 49 mm that is smaller than the target of 50 mm, and the thickness ratio $h_2/h_1$ is set to be the lower limit (minimum) of 0.50.

Here, in the above Equation (4), when k=0.6 and m=0.7, and, further, the angle $\theta_1$ of the above Equation (5) is used instead of the angle α, and the refractive index nd=1.55, a tolerable range for the thickness ratio $h_2/h_1$ is a region DD3 demarcated by a straight line R3 in FIG. 12. In the case of Example 3, in which $h_2/h_1$=0.50, these conditions, that is, the conditions relating to the above Equation (4) and the like, are satisfied. Moreover, the requirements of the above Equation (13) are also satisfied. In other words, the thickness ratio $h_2/h_1$ satisfies both requirements for the upper and lower limits.

As described above, Example 1 is an aspect in which reliable image formation can be secured while maintaining a more compact shape that fits the head shape of the observer, in a wide angle of view with a horizontal angle of view (FOV) of 45°.

Others

The present disclosure is described above based on the exemplary embodiments. However, the present disclosure is not limited to the above-described exemplary embodiments, and can be embodied in various aspects without departing from the spirit and scope of the present disclosure.

First, in the above description, numerical values such as the horizontal angle of view (FOV) are examples, and different values are possible depending on the required specifications.

Additionally, as the image display device 80, various kinds of image display devices other than the image display device described above can be utilized, such as HIPS as a transmissive liquid crystal display device. For example, a configuration using a reflective liquid crystal display device can also be employed, or a digital micro-mirror device and the like can also be used in place of the image display element formed of the liquid crystal display device and the like.

Additionally, occurrence of ghost light or the like may further be suppressed by appropriately providing an AR coating on a lens surface of each lens.

Additionally, the techniques of the present disclosure may be employed in a so-called closed-type (not see-through type) virtual image display device configured to cause only image light to be visually recognized. In addition, the techniques of the present disclosure may also be employed in a device enabling an observer to visually recognize or observe an external world image in a see-through manner, and may be applied to a so-called video see-through product that is configured by a display and an image capturing device.

Additionally, the techniques of the present disclosure are applicable to a binocular type hand held display or the like.

Further, in the above description, with respect to the location at which the semi-transmissive reflective film, which transmits a part of the video image light and reflects another part of the video image light, is provided, it is conceivable that a similar role is achieved by providing, for example, an optical function surface formed by a diffraction element such as a volume hologram or the like, in place of the semi-transmissive reflective film.

As described above, the virtual image display device of an aspect of the present disclosure includes a video image element configured to display an image, and a light-guiding member configured to guide video image light from the video image element by reflection and transmission at a plurality of light-guiding surfaces. Among the plurality of light-guiding surfaces, with respect to an incident-side light-guiding surface and an emission-side light-guiding surface that are adjacent to each other, and an opposing light-guiding surface that faces the incident-side light-guiding surface and the emission-side light-guiding surface, a thickness from the incident-side light-guiding surface to the opposing light-guiding surface is smaller than a thickness from the emission-side light-guiding surface to the opposing light-guiding surface.

In the above-described virtual image display device, by making the light-guiding member more compact as a result of utilizing a difference in thickness provided at the above-described location among the plurality of light-guiding surfaces configuring the light-guiding member, when widening the angle of view of the HMD, a more compact shape that fits a head shape of an observer can be maintained.

In a specific aspect of the present disclosure, the light-guiding member includes a step portion that makes a difference between the thickness from the incident-side light-guiding surface to the opposing light-guiding surface and the thickness from the emission-side light-guiding surface to the opposing light-guiding surface. In this case, a desired difference in the thickness can be provided by the step portion.

In another aspect of the present disclosure, the step portion generates a difference of 2.5 mm or greater in a thickness direction between the incident-side light-guiding surface and the emission-side light-guiding surface. In this case, a sufficient difference in the thickness required to achieve downsizing can be generated.

In yet another aspect of the present disclosure, the step portion is provided with a taper angle of 3° to 10° and connects the incident-side light-guiding surface and the emission-side light-guiding surface. In this case, by providing the above-described taper angle, unintentional reflection of light at the step portion can be suppressed.

In yet another aspect of the present disclosure, a thickness ratio $h_2/h_1$ is $h_2/h_1 \geq 0.5$, when a thickness from the emission-side light-guiding surface to the opposing light-guiding surface is $h_1$, and a thickness from the incident-side light-guiding surface to the opposing light-guiding surface is $h_2$. In this case, the optical path of the video image light that takes account of the angle of view in the light-guiding member can be secured.

In yet another aspect of the present disclosure, a value of a thickness from the incident-side light-guiding surface to the opposing light-guiding surface is larger than a value of a distance from an intersection point to the opposing light-guiding surface, the intersection point being an intersection point of principal rays of components of the video image light emitted from a most peripheral one end and another end of the video image element, and being the intersection point closest to a location at which the incident-side light-guiding surface and the emission-side light-guiding surface are adjacent to each other. In this case, the optical path of the video image light in the light-guiding member can be secured using the intersection point as a reference.

In yet another aspect of the present disclosure, the light-guiding member includes a non-axisymmetric curved surface as the plurality of light-guiding surfaces, and forms an intermediate image therein. In this case, a high-quality image can be formed while maintaining an optical path length suitable for an HMD.

In yet another aspect of the present disclosure, the incident-side light-guiding surface is formed at a free form surface portion of the light-guiding member, and the emission-side light-guiding surface and the opposing light-guiding surface are formed at a flat surface portion of the light-guiding member. In this case, a see-through perspective can be secured in the flat surface portion, while maintaining favorable image formation by allowing aberration correction in the free form surface portion.

In yet another aspect of the present disclosure, the light-guiding member includes a first surface, a second surface, a third surface, and a fourth surface as the plurality of light guiding surfaces. The fourth surface is the incident-side light-guiding surface, the third surface is the opposing light-guiding surface, and the first surface is the emission-side light-guiding surface. The video image light is reflected by the fourth surface, reflected by the third surface, reflected by the first surface, and reflected by the second surface, and then passes through the first surface to reach an observation side. In this case, the first surface, the third surface, and the fourth surface that are the plurality of light-guiding surfaces can form the emission-side light-guiding surface, the opposing light-guiding surface, and the incident-side light-guiding surface.

In yet another aspect of the present disclosure, video image display is performed with a horizontal angle of view of 25° or greater. In this case, the image formation with a wider angle of view is possible compared to related art.

In yet another aspect of the present disclosure, in the light guiding member, a distance from a reference incident position of the video image light to a reference emission position is not greater than 54 mm. In this case, an appropriate size can be maintained as the light-guiding member 10.

In yet another aspect of the present disclosure, the light-guiding member guides the video image light along a direction in which the eyes of an observer are aligned, when the virtual image display device is worn. In this case, it is possible to avoid a design in which the virtual image display device extends excessively in the horizontal direction.

In yet another aspect of the present disclosure, the light-guiding member causes the video image light to pass through the emission-side light-guiding surface and the opposing light-guiding surface and causes the video image light and external light to be simultaneously visually recognized. In this case, as a result of image formation of a see-through image in which the video image light and the external light are superimposed and observed, it is possible to cause visual recognition by the observer through augmented reality (AR).

Further, a virtual image display device according to another aspect of the present disclosure includes a video image element configured to display an image, and a light-guiding member configured to guide video image light from the video image element by reflection and transmission at a plurality of light-guiding surfaces. Among the plurality of light-guiding surfaces, of an incident-side light-guiding surface and an emission-side light-guiding surface that are disposed on a incident side of external light and an opposite side thereof and that are adjacent to each other, the emission-side light-guiding surface protrudes further than the incident-side light-guiding surface.

What is claimed is:

1. A virtual image display device comprising:
a video image element configured to display an image; and
a light-guiding member configured to guide video image light from the video image element by reflection and transmission at a plurality of light-guiding surfaces, wherein
with respect to, among the plurality of light-guiding surfaces, an incident-side light-guiding surface and an emission-side light-guiding surface that are adjacent to each other, and an opposing light-guiding surface opposite to the incident-side light-guiding surface and the emission-side light-guiding surface, a thickness from the incident-side light-guiding surface to the opposing light-guiding surface is smaller than a thickness from the emission-side light-guiding surface to the opposing light-guiding surface, and the incident-side light-guiding surface, the emission-side light-guiding surface and the opposing light-guiding surface are flat surfaces that are parallel to each other.

2. The virtual image display device according to claim 1, wherein
the light-guiding member includes a step portion that makes a difference between the thickness from the incident-side light-guiding surface to the opposing light-guiding surface and the thickness from the emission-side light-guiding surface to the opposing light-guiding surface.

3. The virtual image display device according to claim 2, wherein
the step portion makes a difference of 2.5 mm or greater in a thickness direction between the incident-side light-guiding surface and the emission-side light-guiding surface.

4. The virtual image display device according to claim 2, wherein
the step portion, that has a taper angle of 3° to 10°, connects the incident-side light-guiding surface and the emission-side light-guiding surface.

5. The virtual image display device according to claim 1, wherein
a thickness ratio $h_2/h_1$ satisfies $h_2/h_1 \geq 0.5$,
where a thickness from the emission-side light-guiding surface to the opposing light-guiding surface is $h_1$, and a thickness from the incident-side light-guiding surface to the opposing light-guiding surface is $h_2$.

6. The virtual image display device according to claim 1, wherein
a value of a thickness from the incident-side light-guiding surface to the opposing light-guiding surface is larger than a value of a distance from an intersection point to the opposing light-guiding surface, the intersection point being one of intersection points of principal rays of components of the video image light emitted from a most peripheral one end and another end of the video image element, and the intersection point being closest to a location at which the incident-side light-guiding surface and the emission-side light-guiding surface are adjacent to each other.

7. The virtual image display device according to claim 1, wherein
the light-guiding member includes a non-axisymmetric curved surface as one of the plurality of light-guiding surfaces, and forms an intermediate image therein.

8. The virtual image display device according to claim 1, wherein
the incident-side light-guiding surface is formed at a free form surface portion of the light-guiding member, and
the emission-side light-guiding surface and the opposing light-guiding surface are formed at a flat surface portion of the light-guiding member.

9. The virtual image display device according to claim 1, wherein
the light-guiding member includes a first surface, a second surface, a third surface, and a fourth surface as the plurality of light guiding surfaces,
the fourth surface is the incident-side light-guiding surface,
the third surface is the opposing light-guiding surface,
the first surface is the emission-side light-guiding surface, and
the video image light is reflected by the fourth surface, reflected by the third surface, reflected by the first surface, and reflected by the second surface, and then passes through the first surface to reach an observation side.

10. The virtual image display device according to claim 1, wherein video image display is performed with a horizontal angle of view of 25° or greater.

11. The virtual image display device according to claim 1, wherein,
in the light guiding member, a distance from a reference incident position of the video image light to a reference emission position is not greater than 54 mm.

12. The virtual image display device according to claim 1, wherein
the light-guiding member guides the video image light along a direction in which eyes of an observer are aligned, when the virtual image display device is worn.

13. The virtual image display device according to claim 1, wherein
the light-guiding member causes the video image light to pass through the emission-side light-guiding surface, and external light to pass through the emission-side light-guiding surface and the opposing light-guiding surface to be simultaneously visually recognized.

14. A virtual image display device comprising:
a video image element configured to display an image; and
a light-guiding member configured to guide video image light from the video image element by reflection and transmission at a plurality of light-guiding surfaces, wherein
the plurality of light-guiding surfaces include an incident-side light-guiding surface and an emission-side light-guiding surface that are disposed on a side opposite from an incident side of external light and that are adjacent to each other, and the emission-side light-guiding surface protrudes further than the incident-side light-guiding surface, and
the incident-side light-guiding surface, the emission-side light-guiding surface and an opposing light-guiding surface opposite to the incident-side light-guiding surface and the emission-side light-guiding surface are flat surfaces that are parallel to each other.

15. The virtual image display device according to claim 1, wherein
an inclined surface connects the incident-side light-guiding surface and the opposing light-guiding surface, and
a thickness from the incident-side light-guiding surface to the opposing light-guiding surface at an intersection of the opposing light-guiding surface and the inclined surface is smaller than the thickness from the emission-side light-guiding surface to the opposing light-guiding surface.

* * * * *